July 20, 1948.                H. J. FINDLEY                2,445,392
            HEATING AND VENTILATING APPARATUS FOR VEHICLES
                        Filed July 10, 1944
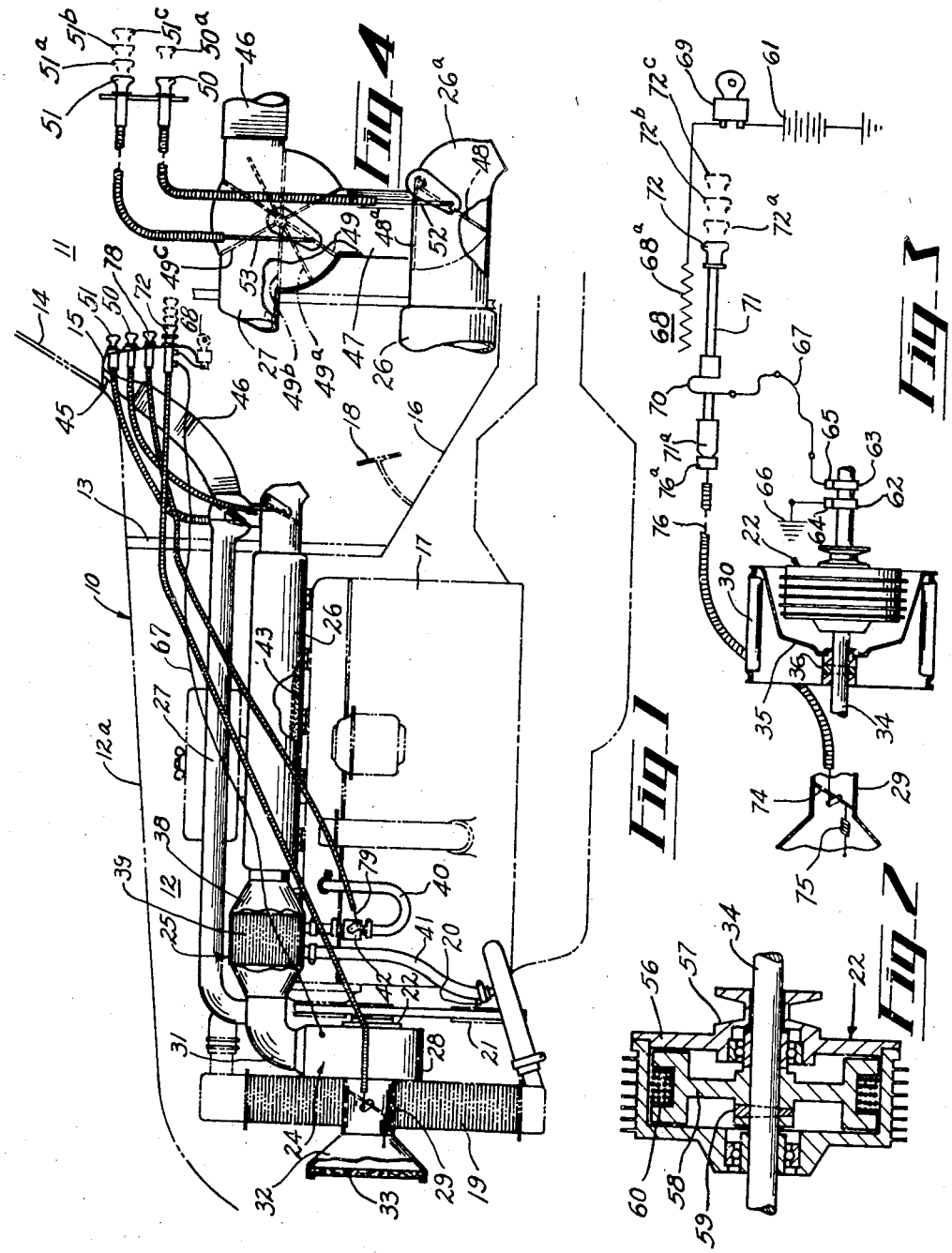
INVENTOR.
HOWARD J. FINDLEY
BY
Kwis Hudson Boughton & Williams
ATTORNEYS Patented July 20, 1948

2,445,392

UNITED STATES PATENT OFFICE 2,445,392

HEATING AND VENTILATING APPARATUS FOR VEHICLES

Howard J. Findley, Shaker Heights, Ohio, assignor to Eaton Manufacturing Company, Cleveland, Ohio, a corporation of Ohio Application July 10, 1944, Serial No. 544,296

8 Claims. (Cl. 237—12.3)

This invention relates to heating and ventilating apparatus for automobiles and other motor vehicles, and aims to provide improved apparatus of this kind by which relatively large volumes of air in a heated, partially heated or unheated state can be supplied to the passenger compartment for heating, ventilating and windshield clearing purposes.

Another object of this invention is to provide improved apparatus of the character mentioned embodying an air heater and a blower located in the engine compartment and in which the air heater has a core connected with the engine cooling system and the blower is driven from a power take-off of the engine through a substantially constant speed coupling.

A further object of this invention is to provide improved apparatus of the kind referred to having by-pass means extending around the core of the air heater for delivering unheated air to the passenger compartment.

Still another object of the present invention is to provide improved apparatus of this character having control means located in the passenger compartment for controlling the operation of the blower and the delivery of air to the passenger compartment through said core and by-pass means.

Other objects and advantages of the present invention will be apparent from the following description when take in conjunction with the accompanying sheet of drawings in which Fig. 1 is a side view with portions broken away showing my heating and ventilating apparatus applied to an automobile or the like;

Fig. 2 is a longitudinal sectional view taken through a constant speed coupling embodied in the blower driving means;

Fig. 3 is a view, partly in section and more or less diagrammatic in form, showing the means for controlling the coupling and the fresh air intake; and Fig. 4 is a partial side view, on a larger scale, showing the means for controlling the delivery of air into the passenger compartment.

My improved heating and ventilating apparatus which will be presently described in detail, can be embodied in or applied to various kinds and makes of motor vehicles. In this instance I show the apparatus applied to an automobile 10 having a passenger compartment 11, and an engine compartment 12 lying under the forwardly extending hood 12a and separated from the passenger compartment by the usual dash-board 13. The passenger compartment 11 includes the usual windshield 14, instrument panel 15 and floor 16. A variable speed vehicle driving engine or motor 17 is located in the engine compartment 12 and is controlled from the passenger compartment 11 by the usual controls which include one or more pedals 18. The engine 17 is here shown as a liquid-cooled engine having a cooling system which includes a conventional radiator 19 located in the forward end of the engine compartment. The engine is also provided at the forward end thereof with power take-off means 20 which includes a pulley 21. The engine 17 can be either a reciprocating or rotary internal combustion engine or could be an internal combustion turbine.

As shown in the drawing the improved heating and ventilating apparatus comprises an air impelling means or blower 24 and an air heater 25 both of which are located in the engine compartment, and main and auxiliary air discharge conduits 26 and 27 for delivering air into the passenger compartment 11. A substantially constant speed coupling 22 forms an important part of the improved apparatus and enables the blower to be driven from the vehicle engine 17 at a substantially constant speed for all engine speeds above a predetermined value. By operating the blower at such a substantially constant speed many important advantages are obtained, including the fact that the blower can be of a lighter and more economical construction. As will be explained more fully hereinafter, the conduit 26 provides a discharge means through which air can be delivered to the passenger compartment from the blower 24 in either a heated or unheated state and the auxiliary conduit 27 provides a by-pass means through which unheated air can be delivered to the passenger compartment while heated air is being delivered thereto through the main conduit 26.

The blower 24 comprises a housing 28 having an intake 29 for cold or fresh air extending forwardly of the radiator 19 and an impeller 30 mounted for rotation in such housing so as to draw air in through the intake 29 and discharge the same through the nozzle or outlet 31. The intake 29 preferably includes a forwardly opening scoop 32 having a screen or filter 33 therein for excluding dust, insects and other foreign matter. The blower 24 also includes a shaft 34 to which the hub or body portion 35 of the impeller 30 is connected as by means of the pin 36. The hub 35 can be of a dished shape as here shown as to house, or partially house, the constant speed coupling 22.

The air heater 25 comprises a housing 38 which is connected with the outlet 31 of the blower 24 and a core 39 located in such housing and connected with the engine cooling system by mean of supply and return conduits 40 and 41. A shut-off valve 42 located in the supply conduit 40 permits the core 39 to be isolated from the engine cooling system so that unheated air can be delivered through the heater 25 and main conduit 26 to the passenger compartment 11 whenever this is desirable, such as during operation of the vehicle in the summer season. The conduit 26 preferably embodies a silence for removing undesirable noises from the air being delivered to the compartment. For this purpose the conduit 26 is provided with a lining or sleeve 43 of a fibrous, cellular or porous sound-absorbing material.

The auxiliary conduit or by-pass means 27 connects the blower outlet 31 with the passenger compartment 11 so that air can be by-passed around the core 39 of the air heater 25 and can be supplied to the passenger compartment in an unheated condition. It is frequently desirable to supply air to the passenger compartment in an unheated condition at the same time that heated air is being supplied through the core 39 and the main discharge conduit 26. Such unheated air is desired mainly for defogging the windshield 14 but can also be supplied to the passenger compartment for regulating the temperature therein. To enable such unheated air to be discharged against or across the windshield 14, the instrument panel 15 is provided with one or more openings or nozzles 45 located adjacent the base of the windshield and connected with the delivery end of the by-pass conduit 27 by means of one or more flexible conduits 46.

It is also desirable at times to supply heated air to the windshield for defrosting purposes and, to permit this to be done, I provide a passage or conduit 47 interconnecting the delivery ends of the main and auxiliary conduits 26 and 27. The interconnection 47 also permits unheated air from the by-pass means 27 to be discharged through the delivery end 26a of the main conduit 26 for mixing with the heated air being supplied through the latter. The delivery of air through the main and auxiliary conduits 26 and 27 can be controlled by means of valves 48 and 49 located therein and adapted to be moved to different positions by corresponding control members 50 and 51 located on the instrument panel 15 and connected with the respective valves by suitable linkage preferably in the form of flexible actuating members or shafts 52 and 53.

When the control member 50 is in its full line position, as shown in Fig. 4, the valve 48 is in a position closing the delivery outlet of the main conduit 26 so as to divert all of the air upwardly through the connection 47 for delivery to the windshield clearing nozzles 45. When the control member 50 is withdrawn to the position 50a the valve 48 occupies the broken line position 48a in which the connection 47 is closed and all of the air being supplied through the main conduit 26 is discharged directly into the passenger compartment through the delivery end 26a. When the control member 50 is moved to a position between its full line position and the position 50a, the valve 48 will occupy a corresponding intermediate position in which unheated air from the auxiliary conduit 27 can be supplied through the connection 47 for mixing with the heated air being delivered through the main conduit 26, or some of the heated air from the main conduit 26 can be diverted upwardly through the connection 47 depending upon the position of the valve 49.

The valve 49 which controls the by-pass conduit 27 is movable from its initial full line position (see Fig. 4) in which the by-pass conduit is completely closed to a plurality of successive positions 49a, 49b and 49c. The closed position 49 corresponds with the full line position of the control member 51 and the positions 49a, 49b and 49c correspond respectively with the positions 51a, 51b and 51c of this control member. When the valve 49 occupies the the position 49b all of the unheated air delivered through the by-pass conduit 27 is supplied to the windshield clearing nozzles 45. When the valve 49 occupies the position 49c all of the unheated air supplied by the by-pass conduit 27 is diverted downwardly through the connection 47 into the main conduit 26 for mixing with the heated air being supplied through the latter. When the valve 49 occupies the position 49a it is in a partially open state and the character of the air then supplied to the windshield will depend upon the position of the valve 48. If the valve 48 is in its lower or closed position heated air will be directed upwardly through the connection 47 and the air then supplied to the windshield will be a mixture of unheated air from the by-pass conduit 27 and heated air from the main conduit 26. If the valve 48 occupies the position 48a while the valve 49 is in this partially open position 49a, a reduced volume of unheated air will then be supplied to the windshield. If the valve 48 occupies an intermediate position the air then supplied to the windshield will be a mixture of unheated air from the by-pass conduit 27 and heated air from the main conduit 26.

The fact that the blower 24 is operated at a substantially constant speed, as mentioned above, is an important feature of the present invention and the driving means by which this is accomplished will be described next. This driving means includes the substantially constant speed coupling 22 which is adapted to operate with slippage and which, in this instance, is in the form of a magnetic or eddy current coupling. The coupling 22 comprises a housing 56, of magnetic material, rotatable on the shaft 34 and carrying a pulley 57. This coupling connects the blower 24 with the engine shaft 20 by the use of any suitable torque-transmitting means such as the endless belt 55 which extends around the pulleys 21 and 57, the latter being of a size to provide an appropriate ratio. A rotor 58 made of magnetic material and disposed in the housing 56, is connected with the shaft 34 as by means of the pin 59 and carries an energizing coil or winding 60.

The housing 56 will be driven continuously and at varying speeds by the vehicle engine 17 but the shaft 34 of the blower 24 will be driven at a substantially constant speed and the slippage occurring between the housing and the rotor 58 will depend upon the energization of the winding 60. This winding can be energized from any available source of electric current such as the storage battery 61 of the vehicle and, for this purpose, I provide an energizing circuit which includes a pair of slip rings 62 and 63 carried by the shaft 34 and connected with the ends of the energizing winding and with which brushes 64 and 65 cooperate. The brush 64 is connected with one terminal of the battery 61 through a common ground connection 66 and the brush 65 is connected with the other terminal of the battery through a conduit 67, a rheostat 68 and a key controlled switch 69 which may also be the ignition switch of the vehicle. The rheostat 68 includes a resistor 68a and a movable contact 70 carried by the pull-rod 71 of a control member 72 mounted on the instrument panel 15 of the vehicle.

In addition to controlling the energization of the magnetic coupling 55, the control member 72 is used to control the intake 29 of the blower 24. To this end the intake is provided with a valve 74 which is normally biased toward an open position by the tension spring 75. A flexible wire 76 operably connects the pull-rod 71 of the control member 72 with the valve 74. The inner end of the pull-rod 71 forms a stop 71a for a thrust member 76a carried by the outer end of the wire 76. During outward movement of the pull-rod 71 the member 76a is held against the stop 71a by the tension spring 75 but after the valve 74 has been fully opened the stop moves away from the thrust member.

When the control member 72 is in its initial or full-line position shown in the drawing, the valve 74 of the blower intake 29 is closed and the contact 70 is disengaged from the resistor 68a and the magnetic coupling 75 is in a de-energized condition. At this time the blower 24 is stopped and no air will be delivered to the vehicle compartment 11. If the vehicle is operating at a relatively high speed and the control member 72 is moved to the position 72a, the valve 74 of the intake 29 will be opened, or partially opened, and the forward motion of the vehicle will cause air to be forced through the heater 25 and through the main and auxiliary conduits 26 and 27 into the passenger compartment 11. At this time the contact 70 is still out of engagement with the resistor 68a and the blower 25 is not being driven.

When the control member 72 is moved to one or the other of the positions 72b and 72c the contact 70 will engage the resistor 68a to thereby energize the magnetic coupling 55 either partially or fully and cause the blower 24 to be driven from the vehicle engine 17 at selected speeds for the delivery of the desired volumes of air into the vehicle compartment through the main and auxiliary conduits 26 and 27. When the control member is in the position 72b the magnetic coupling 55 is only partially energized and operates with an amount of slippage such that the selected speed for the blower 24 will be substantially constant for all engine speeds above a predetermined value. If the delivery of a greater volume of air to the passenger compartment 11 is desired, the control member 72 is moved to the position 72c in which the magnetic coupling is substantially fully energized and will operate with a reduced amount of slippage such that the blower will be driven at a relatively higher speed which will likewise be substantially constant for all engine speeds above the selected predetermined value.

As mentioned above, the conduit 40 through which heated liquid is supplied to the core 39 from the cooling system of the engine 17 contains a shut-off valve 42. It is desirable to be able to actuate this shut-off valve from the passenger compartment 11 and, for this purpose, I provide a control member 78 on the instrument panel 15 and which is connected with the shut-off valve by a flexible wire 79. The control member 78 permits the valve 42 to be opened or closed from the passenger compartment 11 so that either heated or unheated air can be supplied through the main conduit 26 as above explained.

From the foregoing description and the accompanying drawing it will now be readily understood that I have provided improved vehicle heating and ventilating apparatus in which the blower and air heater are located in the engine compartment and in which control means operable from the passenger compartment makes it possible to vary the volume and condition of the air which is delivered to the passenger compartment. It will be seen also that since the blower is driven from a power take-off of the vehicle engine through a magnetic coupling which operates with slippage, the speed of the blower can be selected in accordance with the volume of air desired to be delivered to the passenger compartment and such selected speed will be a substantially constant speed for all operating speeds of the vehicle engine above a predetermined value. It will be seen moreover that my improved apparatus provides for the delivery of air in either a heated or unheated condition to the windshield for defrosting or defogging purposes, and also that my improved system will operate in an efficient manner without placing any substantial load or drain on the battery or electrical system of the vehicle.

While I have illustrated and described my improved vehicle heating and ventilating apparatus in considerable detail, it will be understood, of course, that I do not wish to be correspondingly limited but regard my invention as including all changes and modifications coming within the spirit of the invention and the scope of the appended claims.

Having thus described my invention, I claim:

1. In heating and ventilating apparatus for a vehicle having a passenger compartment, an engine compartment and a liquid-cooled engine in the latter compartment provided with a power take-off, an air heater located in the engine compartment and having a core and an air discharge means leading to said passenger compartment, means connecting said core with said engine to receive heated liquid therefrom and including a shut-off valve, a blower provided with a fresh air intake and connected with said air heater for the delivery of air to said passenger compartment through said core and discharge means, a magnetic coupling connecting said blower with said power take-off, said coupling being operable with slippage so as to drive said blower at a selected substantially constant speed for all engine speeds above a predetermined value, control means located in said passenger compartment and operably connected with said coupling including electrical means for varying the energization of the coupling to enable the selection of said substantially constant speed for the blower, and control means located in said passenger compartment and operably connected with said shut-off valve for controlling the supply of heated l'quid to said core.

2. In heating and ventilating apparatus for a vehicle having a passenger compartment, an engine compartment and a liquid-cooled engine in the latter compartment provided with a power take-off, an air heater located in the engine compartment and having a core and an air discharge means leading to said passenger compartment, means connecting said core with said engine to receive heated liquid therefrom, a blower provided with a fresh air intake and connected with said air heater for the delivery of air to said passenger compartment through said core and discharge means, a substantially constant speed coupling for driving said blower from said power take-off, said coupling being operable with slippage such that the blower will be driven at a substantially constant speed for all engine speeds above a predetermined value, by-pass means extending around the core of said air heater for delivering unheated air to the passenger compartment from said blower, valve means for said discharge means and said by-pass means, and control means located in said passenger compartment and operably connected with said valve means for controlling the volume of air being supplied to the passenger compartment.

3. In heating and ventilating apparatus for a vehicle having a passenger compartment provided with a windshield, an engine compartment and an engine in the latter compartment provided with a power take-off and a liquid cooling system, an air heater located in the engine compartment and having a core connected with said cooling system and an air discharge means leading to said passenger compartment, a blower provided with a cold air intake and connected with said heater for the delivery of air to said passenger compartment through said core and discharge means, a substantially constant speed coupling for driving said blower from said power take-off, said coupling being operable with slippage such that the blower will be driven at a substantially constant speed for all engine speeds above a predetermined value, by-pass means extending around the core of said air heater for delivering unheated air from said blower into said passenger compartment at a point adjacent said windshield, valves for said air discharge means and said by-pass means, and control means in said passenger compartment and operably connected with said valves to actuate the same.

4. In heating and ventilating apparatus for a vehicle having a passenger compartment provided with a windshield, an engine compartment and an engine in the latter compartment provided with a power take-off and a liquid cooling system, an air heater located in the engine compartment and having a core connected with said cooling system and an air discharge means leading to said passenger compartment, a blower provided with a cold air intake and connected with said heater for the delivery of air to said passenger compartment through said core and discharge means, a substantially constant speed coupling for driving said blower from said power take-off, said coupling being operable with slippage such that the blower will be driven at a substantially constant speed for all engine speeds above a predetermined value, by-pass means extending around the core of said air heater for delivering unheated air from said blower to said passenger compartment at a point adjacent said windshield, valves for said air discharge means and said by-pass means, control means in said passenger compartment and operably connected with said valves to actuate the same, and means interconnecting said air discharge means and said by-pass means for diverting air therebetween.

5. In heating and ventilating apparatus for a vehicle having a passenger compartment, an engine compartment and a liquid-cooled engine in the latter compartment provided with a power take-off, an air heater having a core and an air discharge means opening into said passenger compartment, means connecting said core with said engine to receive heated liquid therefrom, a blower provided with a fresh air intake and connected with said air heater for the delivery of air to said passenger compartment through said core and discharge means, a substantially constant speed electromagnetic coupling for driving said blower from said power take-off, a circuit for energizing the coupling, said coupling being operable with slippage such that the blower will be driven at a substantially constant speed for all operating speeds of the engine above a predetermined value, an electric control device in said circuit for varying the energization of said coupling, an actuating member located in said passenger compartment and operably connected with said electric control device, a by-pass extending around said core for delivering unheated air to the passenger compartment from said blower, a valve controlling said by-pass, a valve controlling said air discharge means, and other actuating members located in said passenger compartment and connected with the valves of said air discharge means and by-pass.

6. In heating and ventilating apparatus for a vehicle having a passenger compartment, an engine compartment and a liquid-cooled engine in the latter compartment provided with a power take-off, an air heater having a core and an air discharge means opening into said passenger compartment, means connecting said core with said engine to receive heated liquid therefrom, a blower provided with a fresh air intake and connected with said air heater for the delivery of air to said passenger compartment through said core and discharge means, a substantially constant speed electromagnetic coupling for driving said blower from said power take-off, a circuit for energizing the coupling, said coupling being operable with slippage such that the blower will be driven at a substantially constant speed for all operating speeds of the engine above a predetermined value, an electric control device in said circuit for varying the energization of said coupling, an actuating member located in said passenger compartment and operably connected with said electric control device, a control valve in said fresh air intake, means connecting said valve with said actuating member so as to cause actuation of the valve simultaneously with the actuation of said electric control device, a by-pass extending around said core for delivering unheated air to the passenger compartment from said blower, a valve controlling said by-pass, a valve controlling said air discharge means, and other actuating members located in said passenger compartment and connected with the valves of said air discharge means and by-pass.

7. In heating and ventilating apparatus for a vehicle having a passenger compartment, an engine compartment and a liquid-cooled engine in the latter compartment provided with a power take-off, an air heater having a core and an air discharge means opening into said passenger compartment, means connecting said core with said engine to receive heated liquid therefrom, a blower provided with a fresh air intake and connected with said air heater for the delivery of air to said passenger compartment through said core and discharge means, a substantially constant speed electromagnetic coupling for driving said blower from said power take-off, a circuit for energizing the coupling, said coupling being operable with slippage such that the blower will be driven at a substantially constant speed for all operating speeds of the engine above a predetermined value, an electric control device in said circuit for varying the energization of said coupling, an actuating member located in said passenger compartment and operably connected with said electric control device, a control valve in said fresh air intake, means connecting said valve with said actuating member so as to cause actuation of the valve simultaneously with the actuation of said electric control device, valve means controlling the supply of heated liquid to said core, a second actuating member located in said passenger compartment and operably connected with said valve means, a by-pass extending around said core for delivering unheated air to the passenger compartment from said blower, a valve controlling said by-pass, a valve controlling said air discharge means, and other actuating members located in said passenger compartment and connected with the valves of said air discharge means and by-pass.

8. In heating and ventilating apparatus for a vehicle having a passenger compartment provided with a windshield, an engine compartment and an engine in the latter compartment provided with a power take-off and a liquid cooling system, an air heater having a core and an air discharge means opening into said passenger compartment, means connecting said core with said engine to receive heated liquid therefrom, a blower provided with a fresh air intake and connected with said air heater for the delivery of air to said passenger compartment through said core and air discharge means, a substantially constant speed electromagnetic coupling for driving said blower from said power take-off, a circuit for energizing the coupling, said coupling being operable with slippage such that the blower will be driven at a substantially constant speed for all operating needs of the engine above a predetermined value, an electric control device in said circuit for varying the energization of said coupling, an actuating member located in said passenger compartment and operably connected with said electric control device, a control valve in said fresh air intake, means connecting said valve with said actuating member so as to cause actuation of the valve simultaneously with the actuation of said electric control device, a by-pass extending around said core for delivering unheated air from said blower to the passenger compartment at a point adjacent said windshield, a valve controlling said by-pass, a valve controlling said air discharge means, other actuating members located in said passenger compartment and connected with the valves of said air discharge means and by-pass, and means interconnecting said air discharge means and by-pass for diverting air therebetween.

HOWARD J. FINDLEY.

REFERENCES CITED

The following references are of record in the file of this patent:

UNITED STATES PATENTS

| Number | Name | Date |
| --- | --- | --- |
| 591,395 | Fay | Oct. 12, 1897 |
| 994,764 | Loomis | June 13, 1911 |
| 1,331,384 | Sainsbury | Feb. 17, 1920 |
| 1,602,692 | Markeson | Oct. 12, 1926 |
| 1,978,892 | Bolkcom | Oct. 30, 1934 |
| 2,103,835 | Van Vulpen | Dec. 28, 1937 |
| 2,173,661 | Perrine | Sept. 19, 1939 |
| 2,264,945 | LeFevre | Dec. 2, 1941 |
| 2,383,640 | Findley | Aug. 28, 1945 |